March 9, 1954
C. W. HARRIS
2,671,441
VARIABLE HEAT INSULATING APPARATUS AND
SOLAR HEATING SYSTEM COMPRISING SAME
Filed Sept. 10, 1948
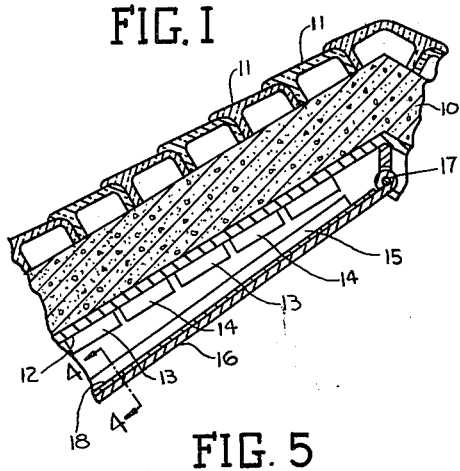
FIG. 1
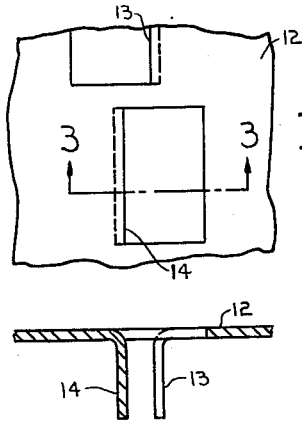
FIG. 2
FIG. 3
FIG. 4
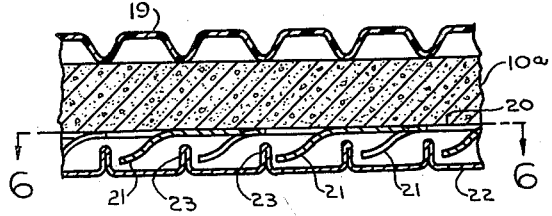
FIG. 5
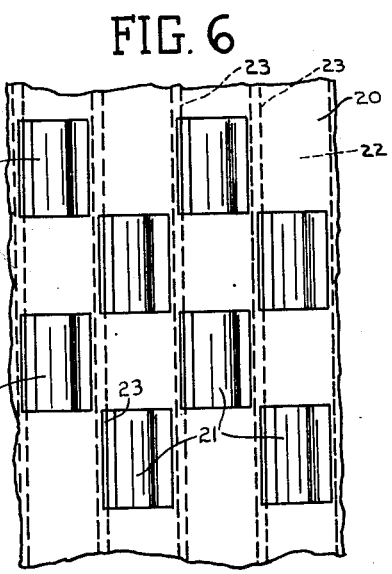
FIG. 6
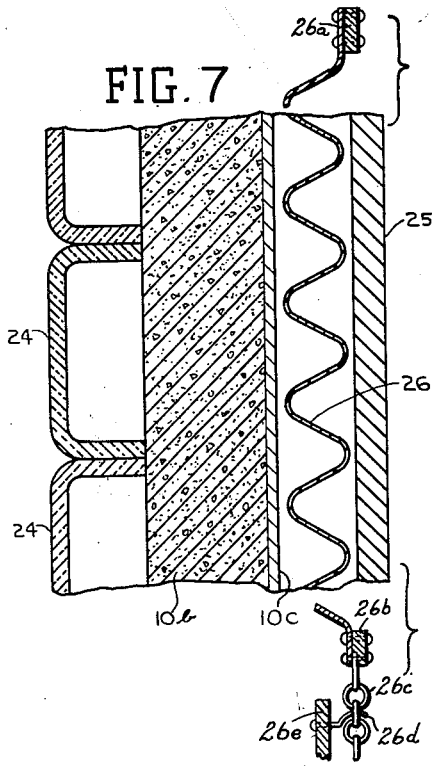
FIG. 7
INVENTOR.
CLYDE W. HARRIS
BY
Willard D. Eakin
Attorney Patented Mar. 9, 1954

2,671,441

UNITED STATES PATENT OFFICE 2,671,441

VARIABLE HEAT INSULATING APPARATUS AND SOLAR HEATING SYSTEM COMPRISING SAME

Clyde W. Harris, Akron, Ohio

Application September 10, 1948, Serial No. 48,671

3 Claims. (Cl. 126—270)

This invention relates to variable heat-insulating apparatus and to a solar heating system inclusive of such apparatus.

Its chief object is to provide a solar heating system having provision for storing solar heat and variable heat-insulating means for controlling the rate at which the heat passes to the space wherein a controlled temperature is desired, so that stored solar heat can be economically used and its use thus distributed over a long period of time.

Further objects are to provide improved variable heat-insulating means, having the advantages of efficiency and economy of construction.

Of the accompanying drawings:

Fig. 1 is a fragmentary vertical section of a roof structure embodying my invention in one of its preferred forms.

Fig. 2 is a fragmentary face view of one of the elements shown in Fig. 1.

Fig. 3 is a section on line 3—3 of Fig. 2.

Fig. 4 is a fragmentary section on line 4—4 of Fig. 1.

Fig. 5 is a fragmentary section of a modification.

Fig. 6 is a fragmentary face view of one of the elements shown in Fig. 5, on line 6—6 of Fig. 5, with an underlying member shown in dotted lines.

Fig. 7 is a fragmentary vertical section of another modification.

Referring first to the embodiment shown in Figs. 1 to 4, the structure there shown comprises a self-supporting roof member 10, permissibly of concrete as shown, having high capacity for storage of heat, and a field of cup-shaped glass members 11, 11 suitably mounted upon it, as described and claimed in my copending application Serial No. 785,316, for causing rays of sun to heat the underlying structure and providing air pockets for insulation against outward passage of the heat.

Suitably secured to the under face of the concrete member 10 and in extensive contact with it is a metal plate 12 having a multiplicity of rows of stamped out and downwardly bent tabs such as the tabs 13, 13 and 14, 14 in such staggered relation as shown in Figs. 2 and 3 that each double row of staggered tabs is adapted to receive, in sliding contact with the tabs, one of a multiplicity of ribs such as the rib 15 formed by bending or crimping of a sheet of metal 16.

The metal sheet 16 is hinged at one margin, as at 17, Fig. 1, and means (not shown) is provided for holding it at different positions about its hinge axis.

When held in the position in which it is shown in Fig. 1, the sheet 16 defines, with the plate 12 and the concrete, an insulating air space for retarding flow of heat from the concrete roof into the interior of the building. To provide additional insulating effect, the plate 16 can be provided upon extensive areas of its upper face with heat-reflecting means such as aluminum foil 18, 18.

When it is desired to increase such flow of heat the sheet 16 is swung on its hinge to a higher position such that each of its numerous ribs 15 enters with a sliding fit between the tabs 13, 14 of a respective double row of the tabs. Metal to metal contact of a multiplicity of the ribs 15 and tabs 13, 14 thus being established, heat rapidly passes by conduction from the body 10 to the lower face of the metal sheet 16 and thus heats the interior of the building. The rate of flow of heat can be varied by varying the angular position of the metal sheet 16 to vary the number or area of contacts between ribs 15 and tabs 13, 14.

In the embodiment shown in Figs. 5 and 6 a ribbed or biscuited sheet of transparent plastic 19 provides for solar heating and outer-face insulation of a wall or roof member 10a which has in extensive contact with its lower face a metal sheet 20 having a multiplicity of spring-like tabs 21, 21 stamped out and bent obliquely downward from the main body of the sheet.

Mounted below the sheet 20, upon means (not shown) for holding it at different distances from the body of the sheet 20, is a metal sheet 22 formed with crimped ribs 23, 23 for stiffness.

When it is at a low position such that it is out of contact with the tabs 21 the sheet 22 defines, with the sheet 20, an air space having high heat-insulating effect, but when it is raised into contact with some or all of the tabs 21 the metal to metal contacts provide more rapid transfer of heat, and the rapidity of the transfer can be varied by varying the number, extent or pressure of contacts between the sheet 22 and the spring-like tabs.

In the embodiment shown in Fig. 7 a building wall 10b, here shown as a concrete wall, is provided on its outer face with a field of cup-shaped glass members 24 providing solar heating and outer-face insulation of the wall. Spaced inwardly from the wall 10b is a metal sheet or wall 25 having good heat conductivity but defining, with the wall 10b, a heat-insulating air space.

In the said space is suspended, from a fixed supporting bar 26a, a springy, corrugated metal sheet 26. For vertically stretching and relaxing the corrugated sheet 26 its lower margin has secured to it a stiffening bar 26b and a chain 26c, the chain being adapted to have its links selectively engaged with a hold-down hook 26d projecting from a fixed standard 26e, to hold the lower margin of the corrugated sheet at different heights. The corrugations are of such dimensions in relation to the thickness of the space that when the sheet is relaxed the flutes on one side of the sheet will strongly contact the wall 10b while those on the other face of the sheet strongly contact the metal sheet 25, for rapid transfer of heat, but when the sheet is stretched and the angles of the corrugations thus changed the sheet will have less contact, or no contact, with the member 10b or the member 25, and the air space between those two members will provide effective insulation. Such insulation is especially effective when the corrugations are horizontally disposed, as in Fig. 7, so that they serve as baffles against gravity convection currents. Preferably the concrete wall 10b is provided with a sheet metal facing 10c for effective transmission of heat to the member 26.

While supplementary insulation is not shown in Fig. 5 or Fig. 7, the use of supplemental insulation, as in Figs. 1 and 4, is not excluded.

In all of the embodiments shown, insulation is in effect by-passed by a set of heat-conducting members of high conductivity, and the well known greater comfort of radiant heating, as compared with convection heating, is provided.

Further modifications are possible without departure from the scope of the invention as defined in the appended claims.

I claim:

1. A solar heating system comprising an opaque building-structure member, means on the outer face thereof for insulating it against outward passage of heat while transmitting rays of the sun to it as light rays, for conversion to heat by the opacity of said building-structure member, and variable insulation means for controlling passage of heat into the interior of the building from said member, said insulation means comprising a sheet of material adapted to be spaced from the said member and thus to define therewith a heat-insulating air space, and, in said space, heat-conducting, variable-contact means manipulatable to provide a multiplicity of heat-conduction paths through the last said means from the building-structure member to the interior of the building.

2. A solar heating system comprising an opaque building structure exposed to light rays of the sun for conversion of said rays to heat by reason of its opacity, and variable insulation means for controlling passage of heat into the interior of the building from said member, said means comprising heat-insulation, a multiplicity of heat-conductive elements extendable through said insulation into contact with said structure and reversely movable out of contact therewith, and means for effecting such movements of said heat-conductive elements.

3. A system as defined in claim 2 in which the recited multiplicity of heat-conductive elements are corrugations of a corrugated metal sheet and the recited means for effecting their movements comprises means for stretching and relaxing said corrugated metal sheet.

CLYDE W. HARRIS.

References Cited in the file of this patent

UNITED STATES PATENTS

| Number | Name | Date |
|---|---|---|
| 246,626 | Morse | Sept. 6, 1881 |
| 430,762 | Taylor | June 24, 1890 |
| 504,890 | Ohmart | Sept. 12, 1893 |
| 681,095 | Baker | Aug. 20, 1901 |
| 1,522,708 | Andrews | Jan. 13, 1925 |
| 1,728,697 | Platten et al. | Sept. 17, 1929 |
| 1,764,194 | Bruehl et al. | June 17, 1930 |
| 2,010,180 | De Ferranti | Aug. 6, 1935 |
| 2,030,350 | Bremser | Feb. 11, 1936 |
| 2,068,550 | Knight | Aug. 6, 1937 |
| 2,185,760 | Altenkirch | Jan. 2, 1940 |
| 2,322,591 | Rapp | June 22, 1943 |
| 2,330,632 | Seligman | Sept. 28, 1943 |
| 2,388,940 | Taylor | Nov. 13, 1945 |
| 2,398,371 | Gerspacher | Apr. 15, 1946 |
| 2,451,194 | Bauman | Oct. 19, 1948 |
| 2,469,496 | Christenson | May 10, 1949 |
| 2,471,954 | Harvey | May 31, 1949 |
| 2,480,706 | Brinen | Aug. 30, 1949 |
| 2,484,127 | Stelzer | Oct. 11, 1949 |

FOREIGN PATENTS

| Number | Country | Date |
|---|---|---|
| 493,130 | Great Britain | Dec. 31, 1936 |